(12) United States Patent
Windsor et al.

(10) Patent No.: US 11,490,568 B2
(45) Date of Patent: Nov. 8, 2022

(54) PIVOTING APPARATUS FOR ROW HEAD

(71) Applicant: DEERE & COMPANY, Moline, IL (US)

(72) Inventors: Eric D. Windsor, Geneseo, IL (US);
Eric H. Stone, Port Byron, IL (US);
Steve A. Coon, Long Grove, IA (US);
Nathan E. Krehbiel, Bettendorf, IA (US); Scott E. Faulkner, Orion, IL (US)

(73) Assignee: Deere & Company, Moline, IL (US)

( * ) Notice: Subject to any disclaimer, the term of this patent is extended or adjusted under 35 U.S.C. 154(b) by 387 days.

(21) Appl. No.: 16/815,775

(22) Filed: Mar. 11, 2020

(65) Prior Publication Data
US 2021/0282320 A1    Sep. 16, 2021

(51) Int. Cl.
*A01D 41/14* (2006.01)
*A01D 45/02* (2006.01)
*A01B 73/06* (2006.01)

(52) U.S. Cl.
CPC ......... *A01D 41/144* (2013.01); *A01D 45/023* (2013.01); *A01B 73/065* (2013.01)

(58) Field of Classification Search
CPC .. A01D 41/144; A01D 45/023; A01D 45/021; A01D 47/00; A01D 45/02; A01B 73/065; A01B 73/042
See application file for complete search history.

(56) References Cited

U.S. PATENT DOCUMENTS

| | | | | |
|---|---|---|---|---|
| 600,584 A | * | 3/1898 | Kaye | E05B 65/0864 292/335 |
| 3,324,637 A | * | 6/1967 | John | A01D 41/16 56/2 |
| 3,944,001 A | * | 3/1976 | Warner | A01B 73/044 172/311 |
| 4,133,391 A | * | 1/1979 | Richardson | A01B 73/046 172/1 |
| 4,204,575 A | * | 5/1980 | Richardson | A01B 73/046 172/1 |

(Continued)

FOREIGN PATENT DOCUMENTS

| | | |
|---|---|---|
| DE | 102008042392 A1 | 4/2010 |
| DE | 102016103475 A1 | 8/2017 |

(Continued)

OTHER PUBLICATIONS

Extended European Search Report and Written Opinion issued in European Patent Application No. 21153757.6, dated Aug. 20, 2021, in 06 pages.

*Primary Examiner* — Arpad F Kovacs

(57) ABSTRACT row crop heads and pivoting assemblies associated with the row crop heads operable to displace a crop divider of the row crop heads during folding of a portion of the row crop head are disclosed. In some implementations, a pivoting assembly may include a first bracket coupled to a center frame of a row crop head, a second bracket coupled to a wing frame of the row crop head, and a rotatable locking component rotatably coupled to the first bracket. The rotatable locking component is operable to lock a row divider disposed at an interface between the wing frame and the center frame when the wing frame is moved from an unfolded position to a folded position relative to the center frame.

20 Claims, 15 Drawing Sheets

(56) References Cited

U.S. PATENT DOCUMENTS

| | | | | |
|---|---|---|---|---|
| 4,316,511 A * | 2/1982 | Andersen | ............. | A01B 73/044 172/776 |
| 4,561,505 A * | 12/1985 | Williamson | ......... | A01B 73/044 74/105 |
| 4,660,654 A * | 4/1987 | Wiebe | .................. | A01B 73/044 172/776 |
| 4,867,245 A * | 9/1989 | Stevens | ................ | A01B 73/046 172/776 |
| 4,878,545 A * | 11/1989 | Dyken | ................... | A01B 73/04 172/776 |
| 4,923,017 A * | 5/1990 | Meek | ................... | A01B 73/044 172/776 |
| 5,540,290 A * | 7/1996 | Peterson | .............. | A01B 73/044 172/311 |
| 6,347,503 B1 * | 2/2002 | Esau | ...................... | A01D 34/64 56/15.9 |
| 7,073,604 B1 * | 7/2006 | Dobson | ................ | A01B 73/046 172/663 |
| 7,438,137 B2 * | 10/2008 | Pederson | ............. | A01B 73/044 172/311 |
| 7,841,157 B2 * | 11/2010 | Latuszek | ............. | A01D 34/661 56/6 |
| 8,122,970 B2 * | 2/2012 | Palen | .................... | A01B 73/046 172/776 |
| 9,173,345 B2 * | 11/2015 | Cressoni | ............. | A01D 45/021 |
| 9,220,188 B2 * | 12/2015 | Graham | ............... | A01D 78/146 |
| 10,433,482 B2 * | 10/2019 | Lehman | ............... | A01D 45/021 |
| 11,337,357 B2 * | 5/2022 | Sivinski | ............... | A01B 73/044 |
| 2008/0193210 A1 * | 8/2008 | Beales | ................. | E02F 3/3618 403/326 |
| 2014/0033670 A1 | 2/2014 | Cressoni | | |
| 2014/0260165 A1 | 9/2014 | Lohrentz | | |
| 2016/0057933 A1 | 3/2016 | Van Overschelde et al. | | |
| 2019/0075707 A1 * | 3/2019 | Sivinski | ............... | A01B 73/046 |
| 2019/0104683 A1 * | 4/2019 | Mossman | ........... | A01B 73/044 |
| 2021/0212254 A1 * | 7/2021 | Thomas | ................. | A01D 34/04 |

FOREIGN PATENT DOCUMENTS

| | | |
|---|---|---|
| EP | 2952084 A1 | 12/2015 |
| EP | 3399854 A1 | 11/2018 |
| WO | 2017120343 A1 | 7/2017 |

* cited by examiner

PIVOTING APPARATUS FOR ROW HEAD

FIELD OF THE DISCLOSURE

The present disclosure relates to harvester row heads.

BACKGROUND OF THE DISCLOSURE

Agricultural harvesters use row heads for harvesting crops arranged in rows. Row heads includes divider covers to cover adjacent row units. Row heads may include foldable wings that are movable between a field or unfolded position and a road or folded position. A foldable wings may be placed in the unfolded position when the row head is to be used to harvest crops. The foldable wings may be placed in the folded position when the row head is being transported. Row heads are mounted to an agricultural harvester.

SUMMARY OF THE DISCLOSURE

A first aspect of the present disclosure is directed to a pivoting assembly of a row crop head. The pivoting assembly may include a first bracket configured to be mounted to a first portion of a row crop head; a second bracket configured to be mounted to a second portion of a row crop head movable relative to the first portion; and a rotatable locking component pivotably coupled to the first bracket. The rotatable locking component may be rotatable between an unlocked configuration and a locked configuration in response to movement of the second bracket relative to the first bracket.

A second aspect of the present disclosure is directed to a row crop head for harvesting crops. The row crop head may include a center frame and a wing frame pivotably coupled to the center frame and movable between a folded position in which the wing frame is misaligned with the center frame and an unfolded position in which the wing frame is aligned with the center frame. An interface may be formed between the center frame and the wing frame. The row crop head may also include a crop divider covering at least part of the interface and a pivoting assembly disposed at the interface. The pivoting assembly may include a first bracket coupled to the center frame; a second bracket coupled to the wing frame; and a rotatable locking component pivotably coupled to the first bracket and, in response to movement of the second bracket relative to the first bracket, movable between a locked configuration in which the rotatable locking component secures the crop divider into a folded position when the wing frame is in a folded position and an unlocked position when the wing frame is in an unfolded position.

A further aspect of the present disclosure is directed to a pivoting assembly of a row crop head that includes a center frame and a wing frame pivotably coupled to the center frame between a folded position and an unfolded position. The center frame and the wing frame may define an interface therebetween and may include a crop divider covering at least a portion of the interface. The pivoting assembly may include a first bracket configured to be mounted to the center frame of the row crop head, a second bracket configured to be mounted to the wing frame of the row crop head, and a rotatable locking component. The first bracket may include opposing sides defining a central recess, and the second bracket may include a first pin. The rotatable locking component may be rotatably coupled to the first bracket and receivable into the central recess of the first bracket. The rotatable locking component may include a recess formed at a first end and a locking portion formed at a second end, opposite the first end. The recess may define a first surface and a second surface, and the first pin of the second bracket may be receivable into the recess. The locking portion may be configured to lock the crop divider into a folded position when the wing frame is in the folded position. The rotatable locking component may be rotatable in response to pivoting movement of the second bracket relative to the first bracket.

The various aspects may include one or more features of the following features. The second bracket may include a first pin; the rotatable locking component may include a recess; and the first pin may be removably receivable into a recess of the rotatable locking component to cause rotation of rotatable locking component. The recess of the rotatable locking component may define a first surface and a second surface. Movement of the second bracket away from the first bracket may cause the first pin to engage the first surface to rotate the rotatable locking component into the locked configuration, and movement of the second bracket towards the first bracket may cause the first pin to engage the second surface to rotate the rotatable locking component into the unlocked configuration. The first bracket may also include opposing sides defining a central recess and slots formed into the opposing sides. The second bracket may also include a second pin. End portions of the second pin may be receivable into the slots, and the second bracket may be received into the central recess when the rotatable locking component is in the unlocked configuration. The rotatable locking component may abut the second pin of the second bracket when the rotatable locking component is in the unlocked configuration. The rotatable locking component may also include a hollow sleeve defining a bore. The first bracket may include apertures formed in opposing sides of the first bracket, and a shaft may be received into the bore and the apertures. The rotatable locking component may be rotatable on the shaft. The rotatable locking component may also include a locking portion configured to lock a crop divider of the row crop head into a folded position. A biasing component may be coupled to the first bracket and the rotatable locking component. The biasing component may be operable to apply a biasing force that urges the rotatable locking component into the locked configuration.

The various aspects may also include one or more of the following features. The recess of the rotatable locking component may define a first surface and a second surface. Movement of the wing frame into the folded position may cause the first pin of the second bracket to engage the first surface to rotate the rotatable locking component into the locked configuration. Movement of the wing frame into the unfolded position may cause the first pin of the second bracket to engage the second surface to rotate the rotatable locking component into the unlocked configuration. The rotatable locking component may abut the second pin of the second bracket when the rotatable locking component is in the unlocked configuration. The rotatable locking component may also include a hollow sleeve defining a bore. The crop divider may include a fold frame. The rotatable locking component may include a locking portion and a first surface formed on the locking portion. The locking portion may be receivable into a slot formed in the fold frame, and the first surface may abut an exterior surface of the fold frame when the wing frame is in the folded position. A biasing component may be coupled to the first bracket and the rotatable locking component. The biasing component may be operable to apply a biasing force that urges the rotatable locking component in a direction to cause the first surface of the rotatable locking component to contact the exterior surface of the fold frame.

The various aspects may also include one or more of the following features. The first pin of the second bracket may be configured to contact the first surface of the rotatable locking component to rotate the rotatable locking component in a first direction towards a locked configuration. The first pin of the second bracket may be configured to contact the second surface of the rotatable locking component to rotate the rotatable locking component in a second direction, opposite the first direction, towards an unlocked configuration. The first bracket may also include aligned slots formed in the opposing sides. The second bracket may also include a second pin, and end portions of the second pin may be receivable into the aligned slots when the second bracket is at a first position corresponding to the unfolded position. The second bracket may also include a first side; a second side laterally offset from the first side; and a recess formed between the first side and the second side. The rotatable locking component may include a first end portion and a second end portion, and the recess of the rotatable locking component may be formed between the first end portion and the second end portion. The first pin and the second pin may extend between the first side and the second side across the recess. The first end portion of the rotatable locking component may be positioned within the recess of the second bracket between the first pin and the second pin when the second bracket is at the first position.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
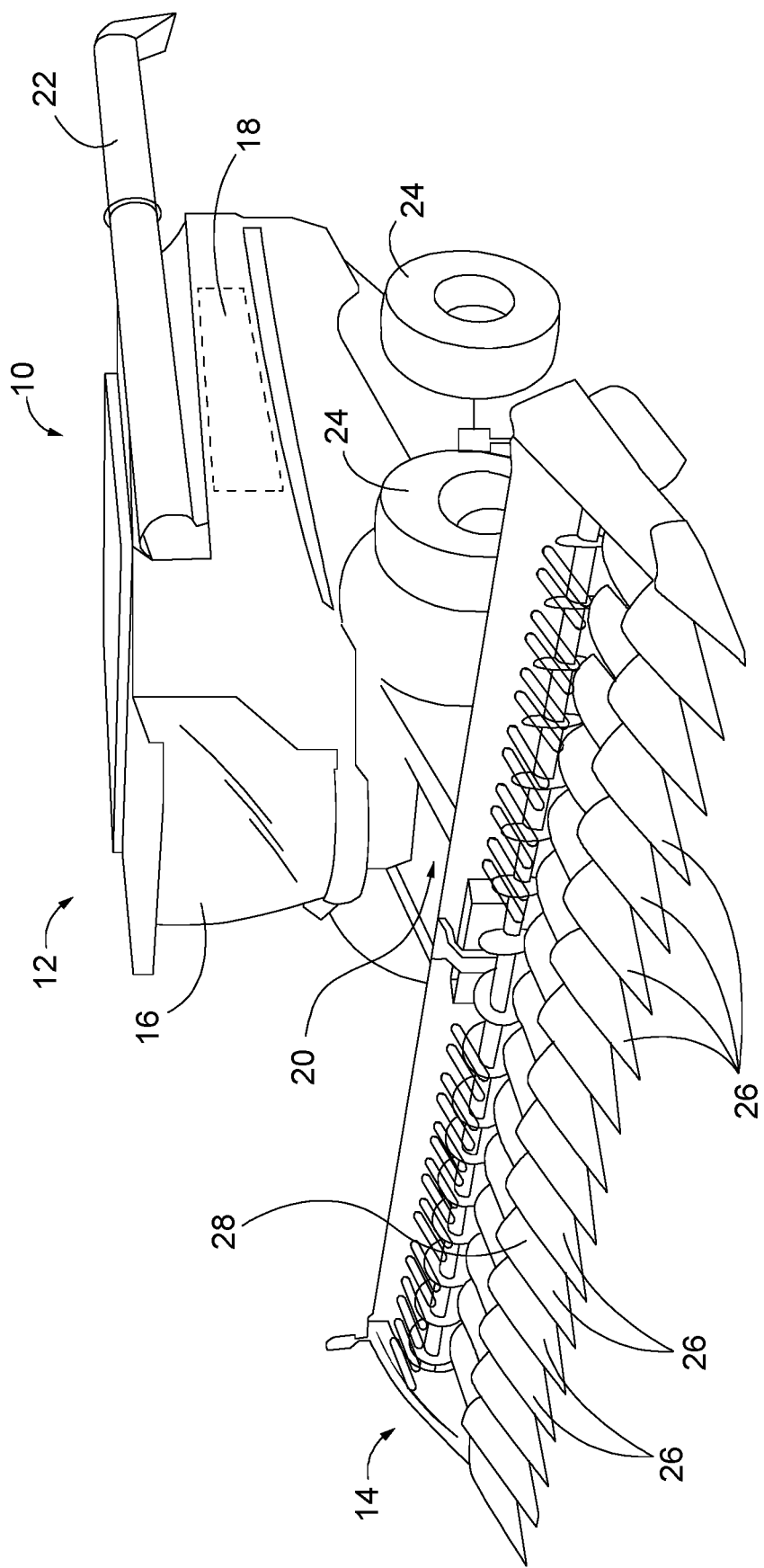
FIG. 1 is a perspective view of a corn harvester having a row crop head, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to row heads and, particularly, row crop heads that include a pivoting apparatus operable to lift a crop divider covering row units, such as stalk roll assembles in the context of corn rows, at a hinged connection between a center frame and wing frame of the row crop head when the wing frame is moved into a folded or road position. The pivoting apparatus is passive but integrated in that rotation of the wing frame relative to the center frame is operable to cause the pivoting assembly to lift the crop divider during folding of the wing frame and lower the wing frame during unfolding of the wing frame without the use of an actuator separate from that used to move the wing frame. The pivoting assembly has a simplified construction with few parts. As a result, the pivoting assembly has a reduced associated cost and a reduced weight and complexity. Further, as explained, the pivoting assembly lacks a separate power source to raise and lower the crop divider during folding and unfolding of the wing frame, respectively. Consequently, a technical effect is to reduce cost, complexity, and weight of the row head. Further, because the pivoting assembly has a simplified construction, assembly of the row head is also simplified, and assembly costs are reduced. Although the present disclosure is made in the context of corn row head implementations, the scope of the disclosure is not so limited. Rather, the scope of the disclosure is intended to encompass other types of row heads. For example, the present disclosure also encompasses cotton stripper heads and other heads configured to harvest crops arranged in rows.

FIG. 1 is a perspective view of an example corn combine harvester 10. The corn combine harvester 10 includes a work vehicle 12 and a row crop head 14. The work vehicle 12 includes an operator cab 16, an engine 18, a hopper 20, a dispensing chute 22, and a plurality of wheels 24. In other implementations, the work vehicle 12 may include one or more tracks in place of the one or more of the wheels 24. The row crop head 14 includes a plurality of crop dividers 26 and a cross auger 28.

Figure 2:
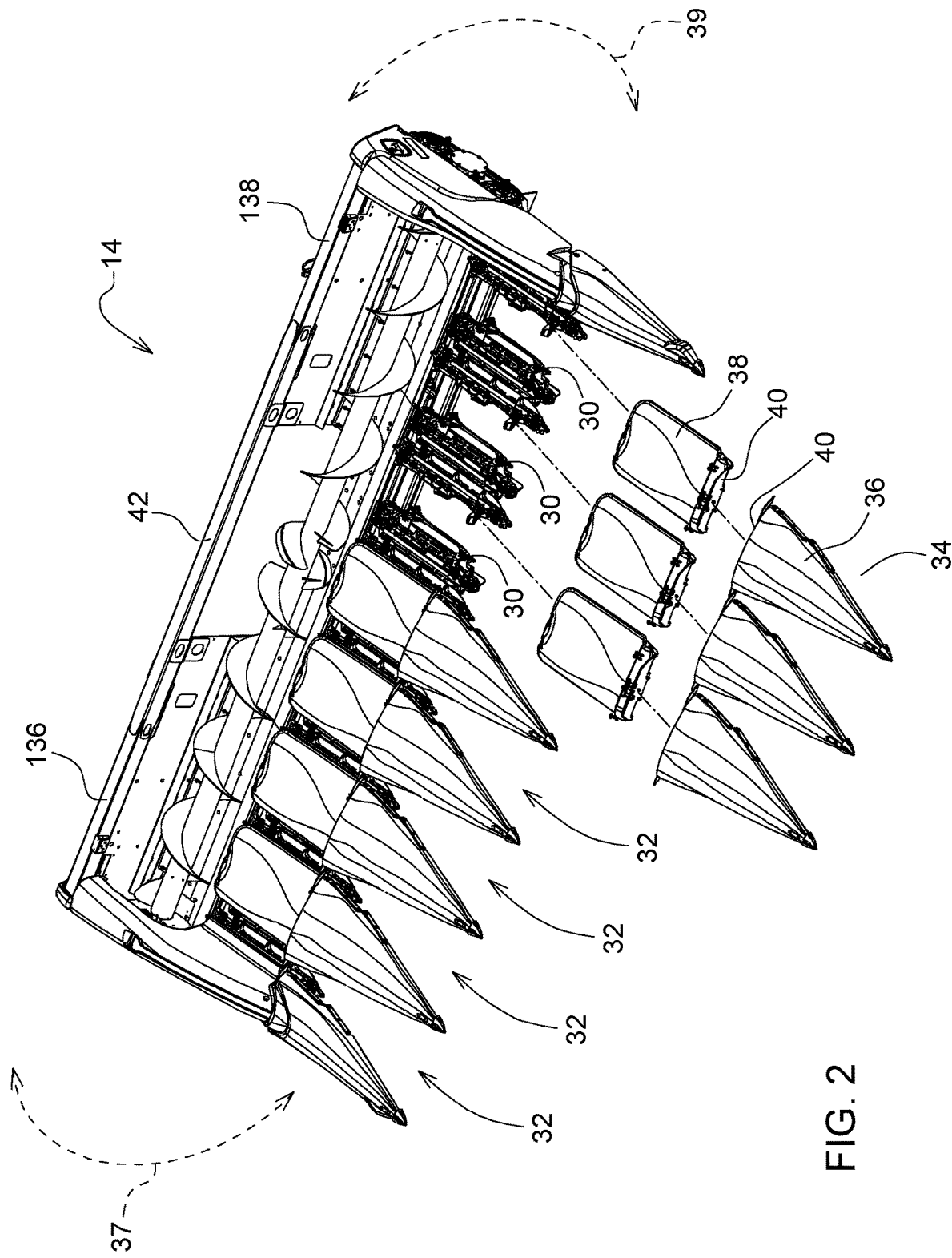
FIG. 2 is a partially exploded view of an example row crop head of FIG. 1.

FIG. 2 is partially exploded view of the row crop head 14. Referring to FIG. 2, the row crop head 14 also includes a plurality of row units 30. The row units 30 define a slot 32 through which crops are fed for harvesting. The row crop head 14 also includes crop dividers 34. As shown, each of the crop dividers 34 includes a first cover portion 36 and a second cover portion 38 positioned proximal to the first cover portion 36. The first cover portion 36 and the second cover portion 38 may have a hinged connection 40. The crop dividers 34 are located between laterally adjacent row units 30. The crop dividers 34 direct corn stalks into the slots 32 of the row units 36. As shown in FIG. 2, some crop dividers 34 are shown removed from associated row units 30.

Figure 3:
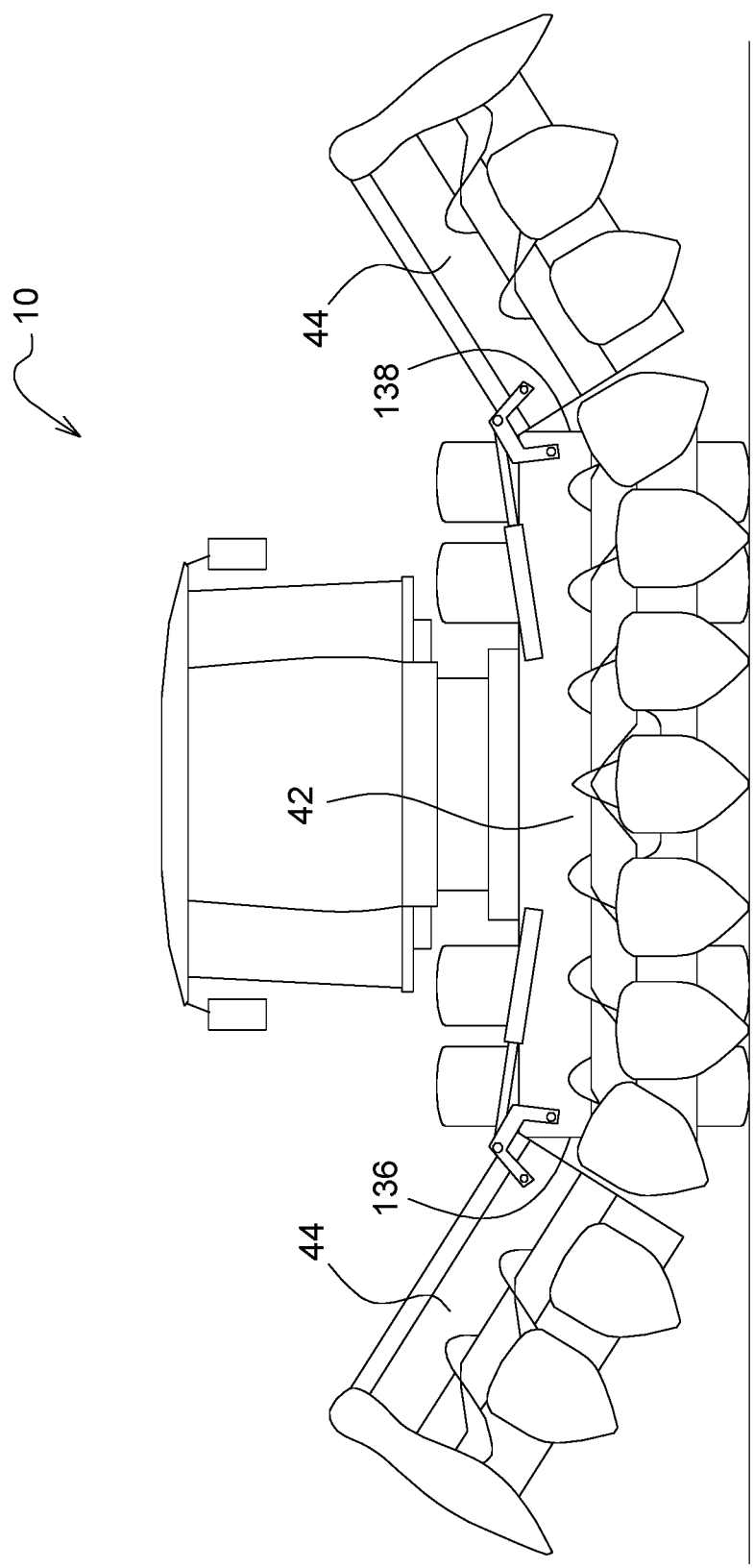
FIG. 3 is a front view of an example corn harvester that includes a row crop head having wings frames partially folded relative to a center frame of the row crop head, according to some implementations of the present disclosure.

The row crop head 14 includes a center frame 42 flanked by wing frames 44 at opposing sides 136 and 138 of the center frame 42. A portion of the row units 30 and the associated crop dividers 34 are coupled to the center frame 42, and a plurality of the row units 30 and the associated crop dividers 34 are coupled to the wing frames 44. The wing frames 44 are pivotable relative to the center frame 42 between a folded or road position and an unfolded or field position. FIG. 3 shows the wing frames 44 partially pivoted relative to the center frame 42. The wing frame 44 positioned at the side 136 is movable in the directions of double-ended arrow 37 to move the wing frame 44 between the unfolded position and the folded position, and the wing frame 44 positioned at the end 138 is movable in the directions of double-ended arrow 39 to move the wing frame 44 between the unfolded position and the folded position. With the wing frames 44 in the folded position, the row crop head 14 is placed in a configuration for transportation. For example, with the wing frames 44 in the folded position, the combine harvester 10 may transport the row crop head 14 through a field or along a roadway without operating the row crop head for production. In some implementations, the wing frames 44 may be rotated 180° relative to the center frame 42 such that the wing frames 44 overlay the center frame 42. With the wing frames 44 in the unfolded position, the row crop head 14 is in a configuration for production, and the combine harvester 10 may operate and direct the row crop head 14 through a field to harvest corn.

Actuators (not shown) are operable to move the wing frames 44 between the folded and unfolded positions. row units 30 associated with the wing frames 44 are mounted thereto such that, when the wing frames 44 are moved between the folded and the unfolded, the associated row units 30 are similarly moved with the wing frames 44. Although the example row crop head 14 includes two wing frames 44, the scope of the disclosure encompasses row heads having fewer or additional wing frames.

The frame wings 44 adjoin the center frame 42 at interfaces 46, which are illustrated schematically in FIG. 2. The interfaces 46 are formed between adjacent row units 30 and are covered by corresponding crop dividers 34. When folding the wing frames 44, the crop dividers 34 that cover the interfaces 46 are repositioned so as to avoid damage to the respective crop dividers 34 during the folding process. A pivoting assembly 48 is provided at each interface in order to reposition the row divider 34 into a raised or folded position during folding of the wing frames 44 as well as to reposition the row divider 34 into a lowered or unfolded position corresponding to the unfolded position of the wing frames 44 when the wing frames 44 are moved into the unfolded position.

Figure 4:
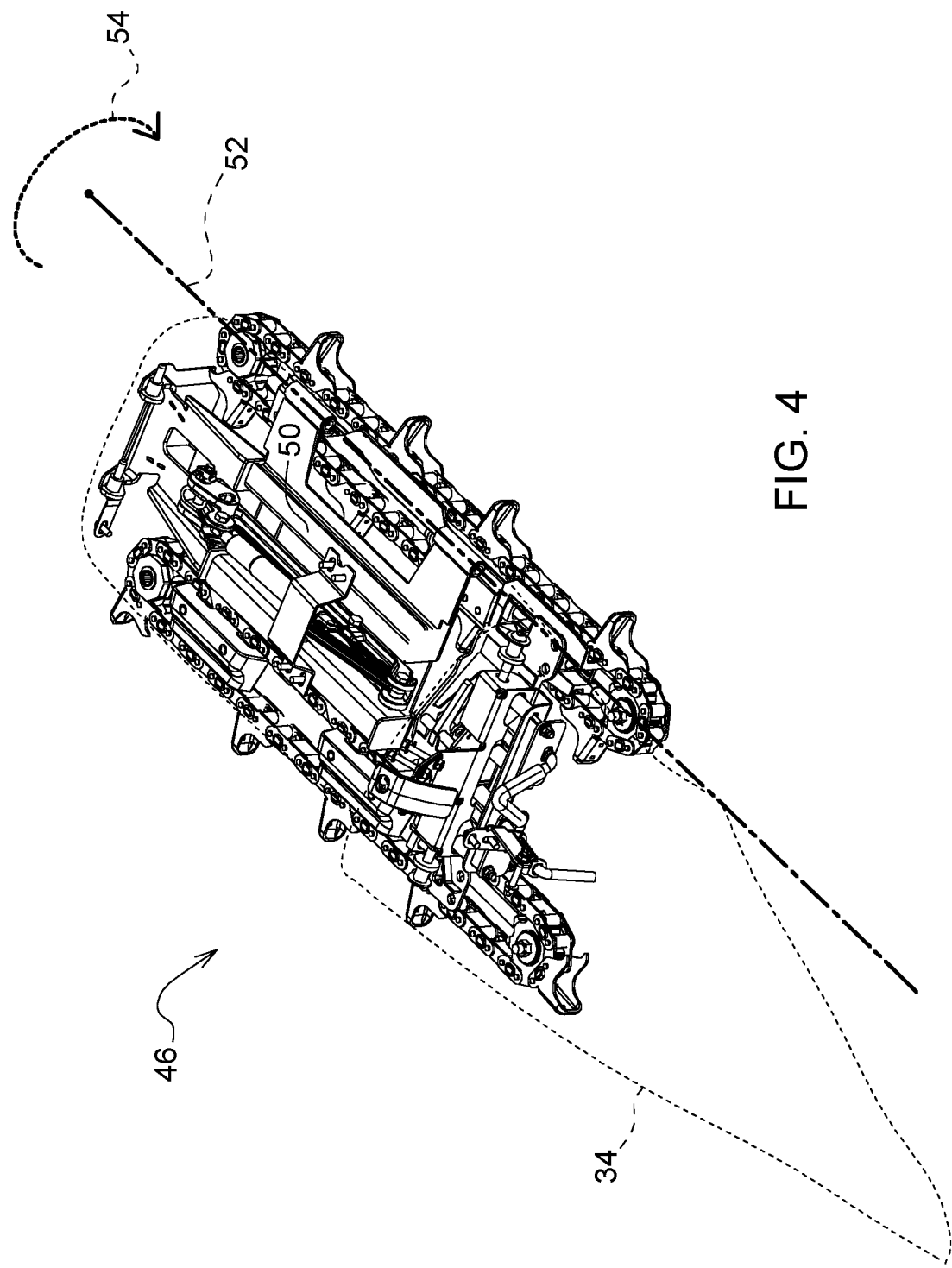
FIG. 4 is a perspective view of a portion of a row crop harvester at an interface between a wing frame and a center frame, according to some implementations of the present disclosure.

FIG. 4 is a perspective view of a portion of the row crop head 14 at an interface 46 between the center frame 42 and a wing frame 44. Referring to FIG. 4, the crop divider 34 is coupled to a fold frame 50. In some implementations, the fold frame 50 forms part of the crop divider 34. The fold frame 50 is pivotably coupled to the center frame 42 about a longitudinal axis 52. During folding of the wing frame 44, the fold frame 50 and crop divider 34 pivot about the longitudinal axis 52 in the direction of arrow 54 in order to reposition the crop divider 34 and prevent damage thereto during the folding process.

Although the fold frame 50 and the crop divider 34 of the illustrated example shown in FIG. 4 are disclosed as pivoting about a common axis, i.e., longitudinal axis 52, in other implementations, the crop divider 34 may pivot about an axis that is different from the fold frame 50. In still other implementations, the crop divider 34, the fold frame 50, or both may be displaced by translation, as opposed to rotation, during folding of the wing frame 44 relative to the center frame 42. Still further, in some implementations, the crop divider 34 and the fold frame 50 may be a single component or an assembly of components that operate as a single component.

Figure 5:
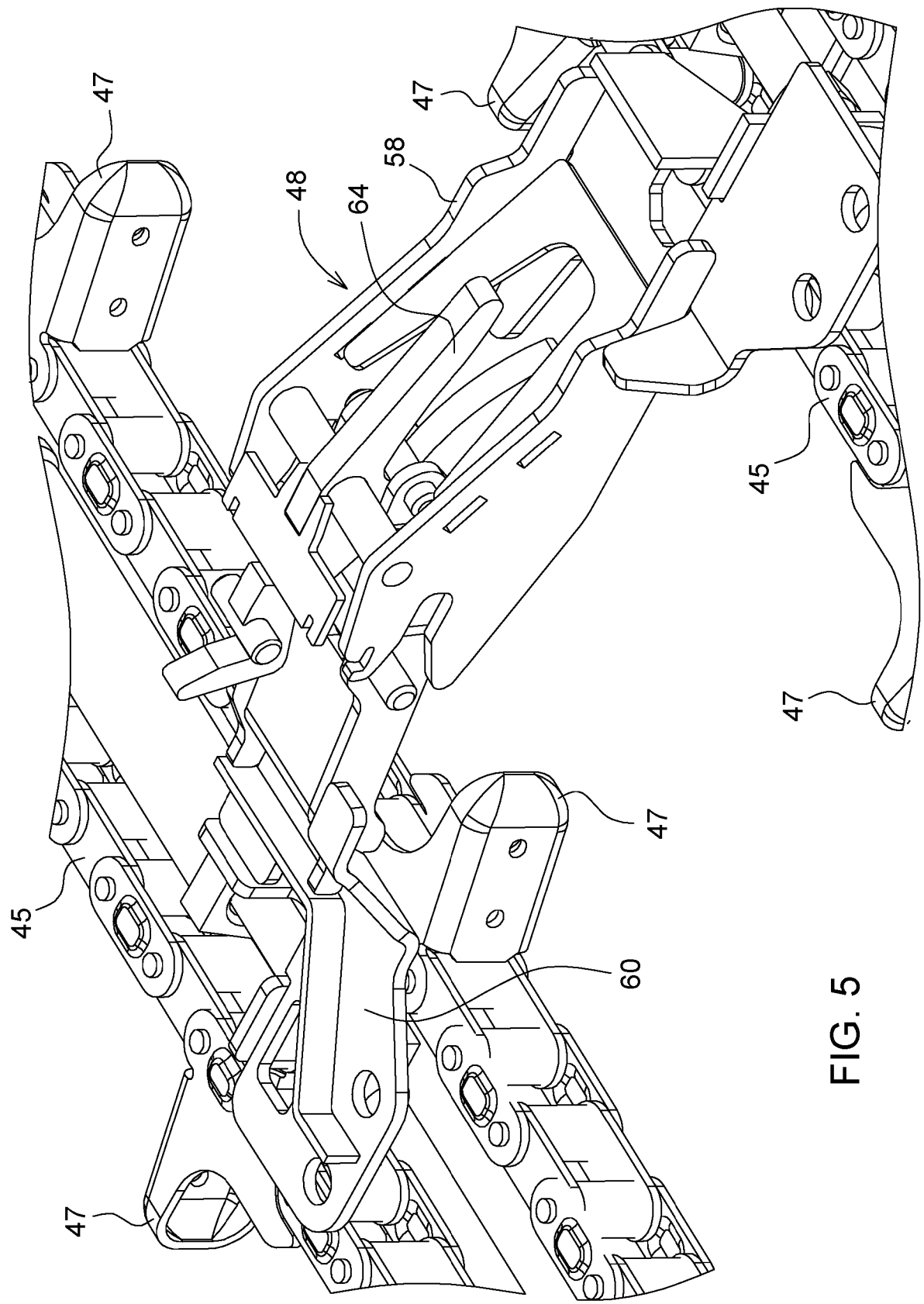
FIG. 5 is a perspective view of an example pivoting assembly, according to some implementations of the present disclosure.

FIG. 5 shows a perspective view of the pivoting assembly 48 that is operable to pivot the crop divider 34 and the fold frame 50 during folding and unfolding of the wing frame 44. Particularly, FIG. 5 shows the pivoting assembly 48 located at the interface at the side 136 of the center frame 42. Row units associated with the crop divider 34 at the interface 46 are omitted for clarity, although gathering chains 45 and associated lugs 47 operable to draw crop stalks into the slots 32 of the row crop head 14 are illustrated for reference. The pivoting assembly 48 includes a first bracket 58 coupled to the center frame 42, a second bracket 60 coupled to the wing frame 44, and a rotatable locking component 64 pivotable relative to the first bracket 58 on a shaft 86, described in more detail below.

Figure 11:
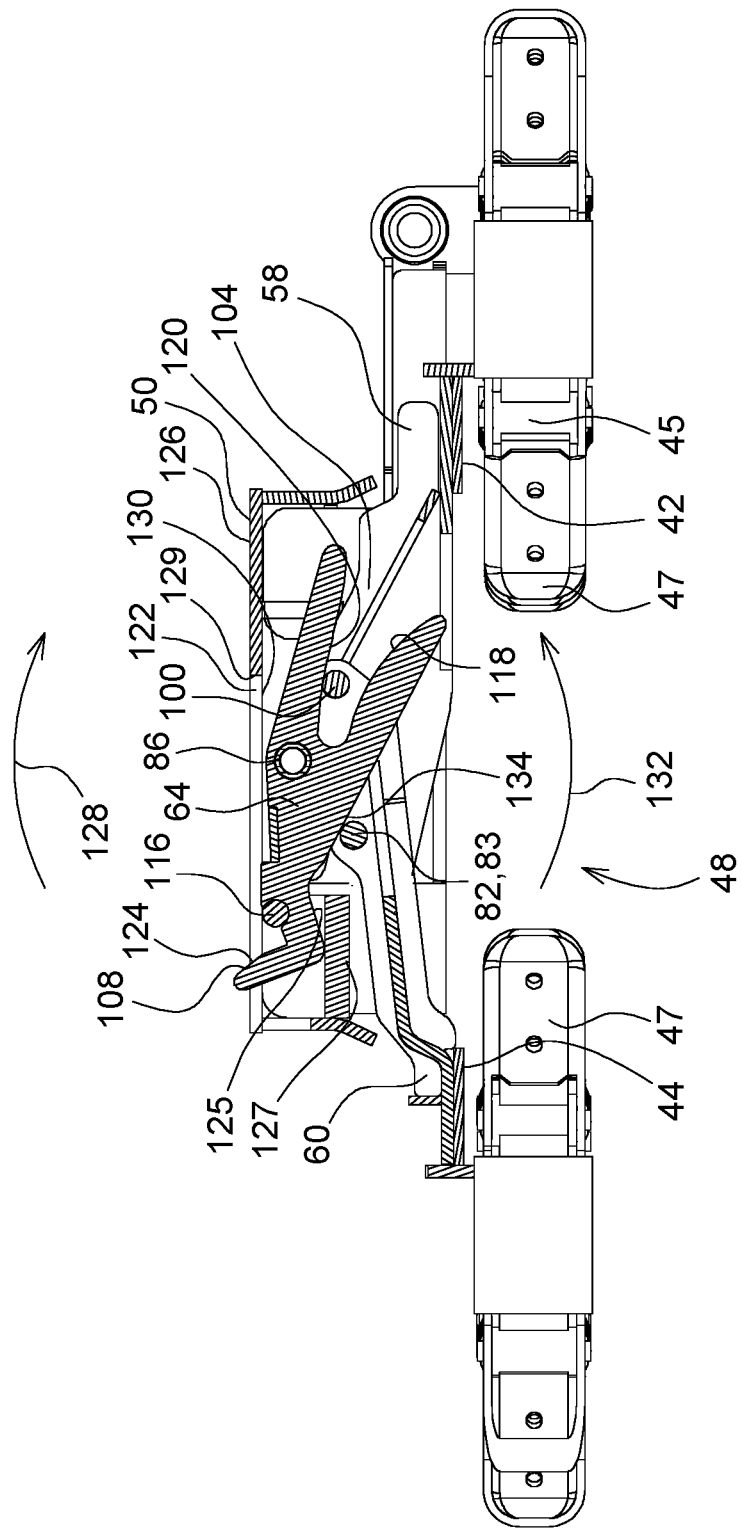
FIG. 11 is a cross-sectional view of an example pivoting assembly in an unfolded configuration, according to some implementations of the present disclosure.

In the illustrated example, a portion of the center frame 42 to which the first bracket 58 is coupled is disposed between the first bracket 58 and the gathering chains 45 of the row units 30, as shown, for example, in FIG. 11. However, in other implementations, a positional relationship between the portion of the center frame 42 to which the first bracket 58 is mounted and the row units 30 may be different. Additionally, a portion of the wing frame 44 to which the second bracket 60 is coupled is disposed between the second bracket 60 and the gathering chains 45 of the row units 30, as shown, for example, in FIG. 11. Again, though, in other implementations, a positional relationship between the portion of the wing frame 44 to which the second bracket 60 is mounted and the row units 30 may be different.

Figure 6:
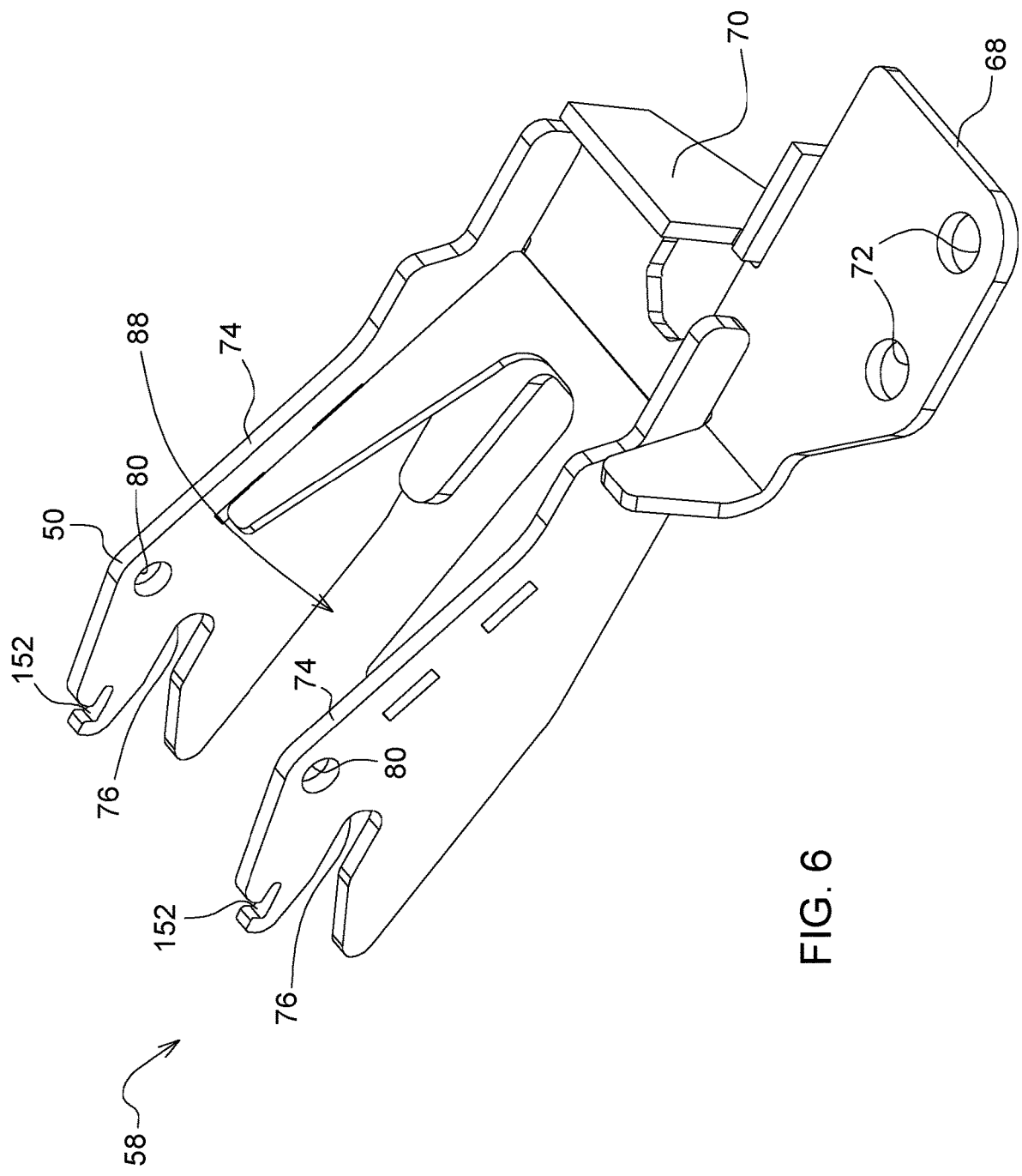
FIG. 6 is a perspective view of a first bracket of the pivoting assembly of FIG. 5.

Referring to FIGS. 5 and 6, the first bracket 58 includes a flange 68 at a first end 70 that attaches to a portion of the center frame 42. Fasteners, such as bolts, may be used to attach the flange 68 to the center frame 42. The fasteners may be received through the apertures 72. The first bracket 58 also includes opposing sides 74 that define aligned slots 76 formed at a second end 78, opposite the first end 70. Aligned apertures 80 are also formed in the opposing sides 74. The aligned slots 76 are configured to receive end portions 82 of a first pin 83 extending from opposing sides 84 of the second bracket 60 and operate to couple the first and second brackets 58 and 60 to each other when the wing frame 44 is in the unfolded position. The aligned apertures 80 receive a shaft 86 on which the rotatable locking component 64 rotates during actuation of the pivoting assembly 48. The first bracket 58 additionally includes a central recess 88. The rotatable locking component 64 and the second bracket 60 are receivable into the central recess 88. Further, the rotatable locking component 64 is rotatable within the central recess 88 about the shaft 86.

Figure 7:
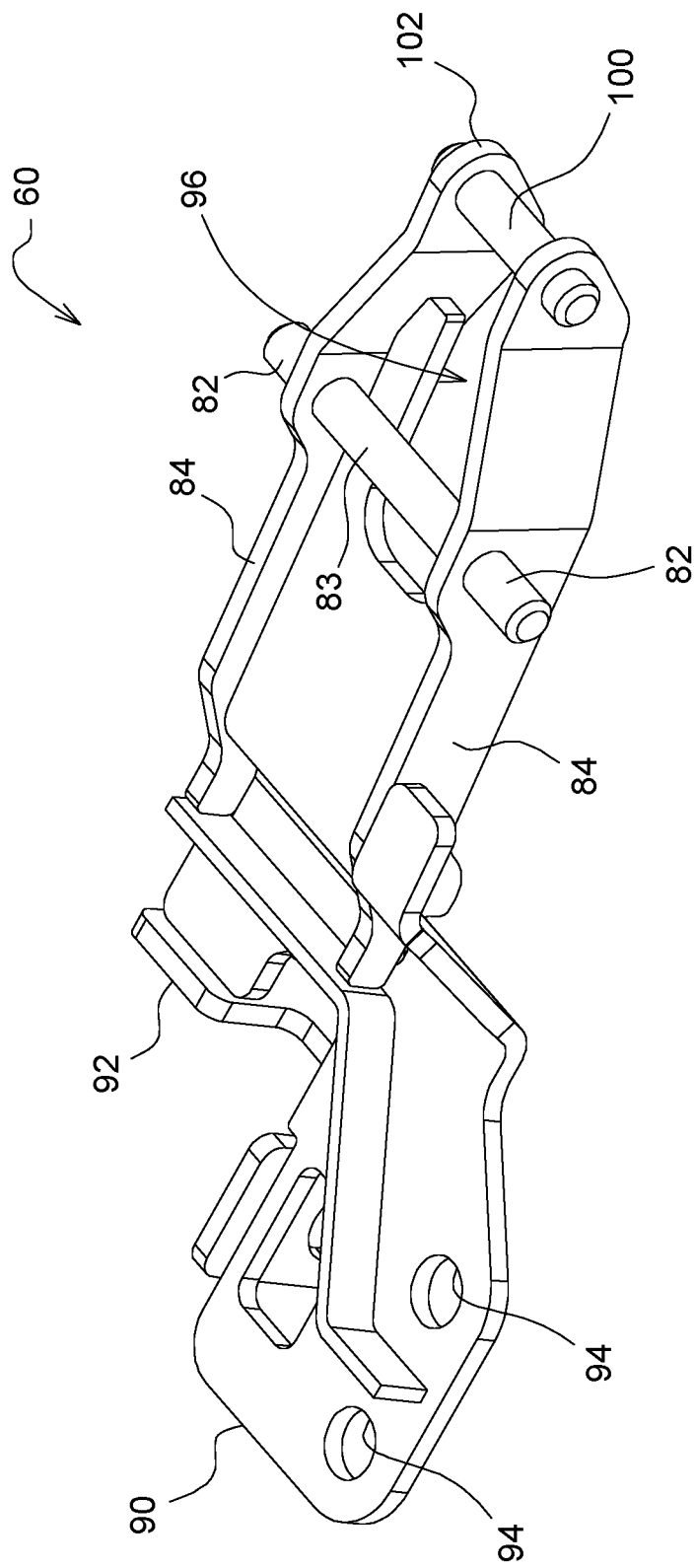
FIG. 7 is a perspective view of a second bracket of the pivoting assembly of FIG. 5.

Referring to FIGS. 5 and 7, the second bracket 60 includes a flange 90 formed at a first end 92. The flange 90 attaches to the wing frame 44 and is movable therewith. Fasteners, such as bolts, may be received through apertures 94 formed in the flange 90 to secure the second bracket 60 to the wing frame 44. The second bracket 60 also includes opposing sides 84. A recess 96 is formed between the opposing sides 84. A first end portion 98 of the rotatable locking component 64 is receivable into the recess 96 between the first pin 83 and a pin 100 of the second bracket 60 when the pivoting assembly 48 is in the unfolded configuration.

The second pin 100 is located at a second end 102 of the second bracket 60, opposite the first end 92, and extending between the opposing sides 84. The first pin 83 is also disposed between the opposing sides 84. The end portions 82 of the first pin 83 extend outwardly from the opposing sides 84. The first pin 83 is operable to cease rotation of the rotatable locking component 64 when the wing frame 44 is placed into the unfolded position. In some implementations, the portion of the first pin 83 extending between the opposing sides 84 may be omitted, and rotation of the rotatable locking component 64 when the wing frame 44 is placed into the unfolded position may be ceased by contact between the rotatable locking component 64 and a shelf formed on the fold frame 50, described in more detail below in the context of FIG. 11. As explained above, the end portions 82 are receivable into the aligned slots 76 formed in the first bracket 58.

Figure 8:
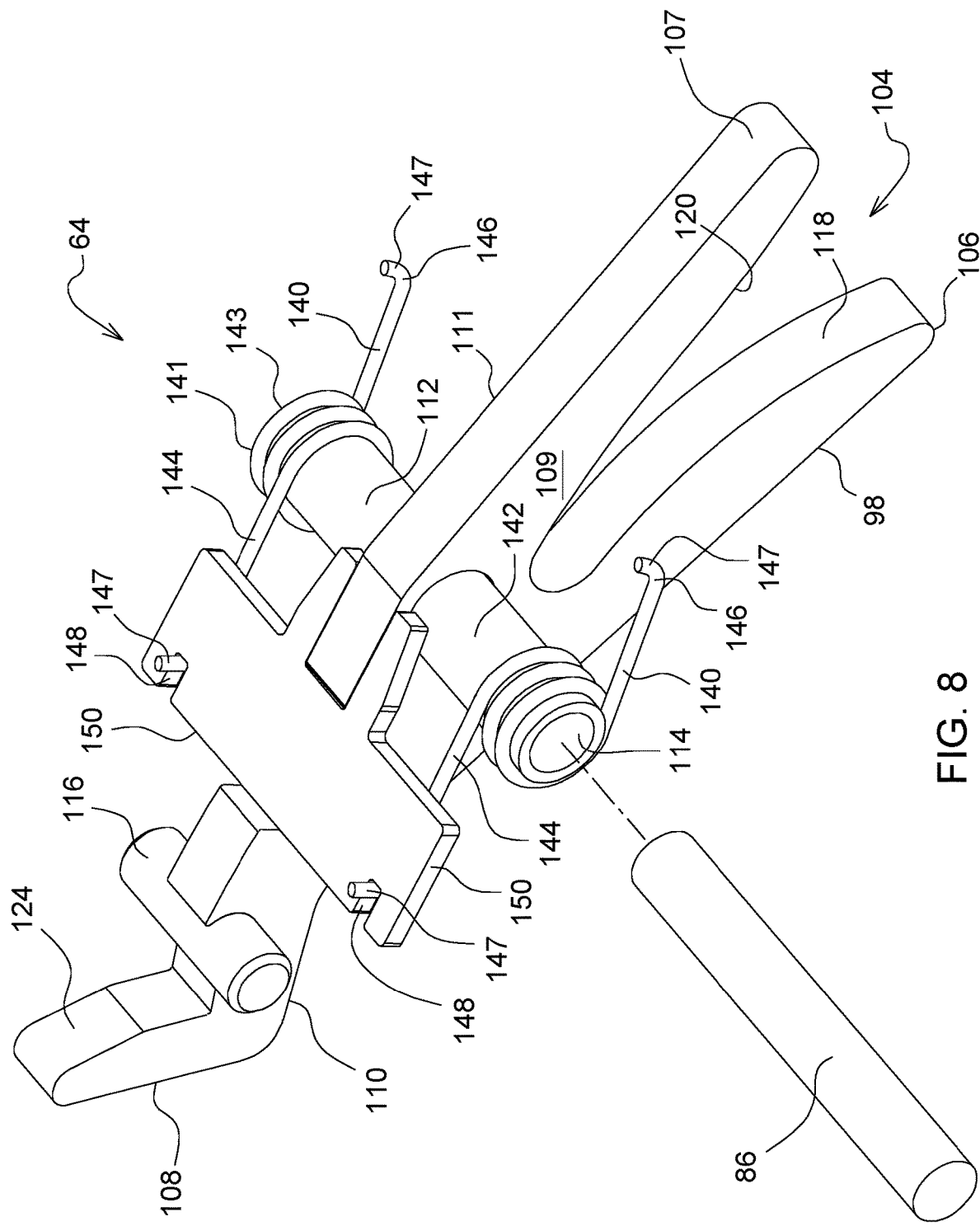
FIG. 8 is a perspective view of a rotatably locking component of the pivoting assembly of FIG. 5.

Referring to FIGS. 5 and 8, the rotatable locking component 64 includes a recess 104 formed at a first end 106 and an L-shaped locking portion 108 formed at a second end 110, opposite the first end 106. The recess 104 is formed between the first end portion 98 and a second end portion 107 provided at the first end 106. A cylindrical sleeve 112 is also included. In the illustrated implementation, the cylindrical sleeve 112 extends from opposing side surfaces 109 and 111. In some implementations, the cylindrical sleeve 112 extends perpendicularly from the sides 109 and 111.

The cylindrical sleeve 112 defines a bore 114 that is adapted to receive the shaft 86, and the rotatable locking component 64 is rotatable on the shaft 86. Thus, the shaft 86 extends through the apertures 80 formed in the opposing sides 74 of the first bracket 58 and through the bore 114 to rotatably mount the rotatable locking component 64 on the first bracket 58. The rotatable locking component 64 also includes a pin 116. The pin 116 is adapted to contact an interior surface of the fold frame 50, as described in more detail below. When the wing frame 44 is located in the folded position, the L-shaped locking portion 108 contacts an exterior surface of the fold frame 50 to secure or lock the fold frame 50 in the folded position. The recess 104 defines a first surface 118 and a second surface 120 that are adapted to engage the second pin 100 of the second bracket 60 during folding and unfolding of the wing frame 44, respectively, as described in more detail below.

Figure 9:
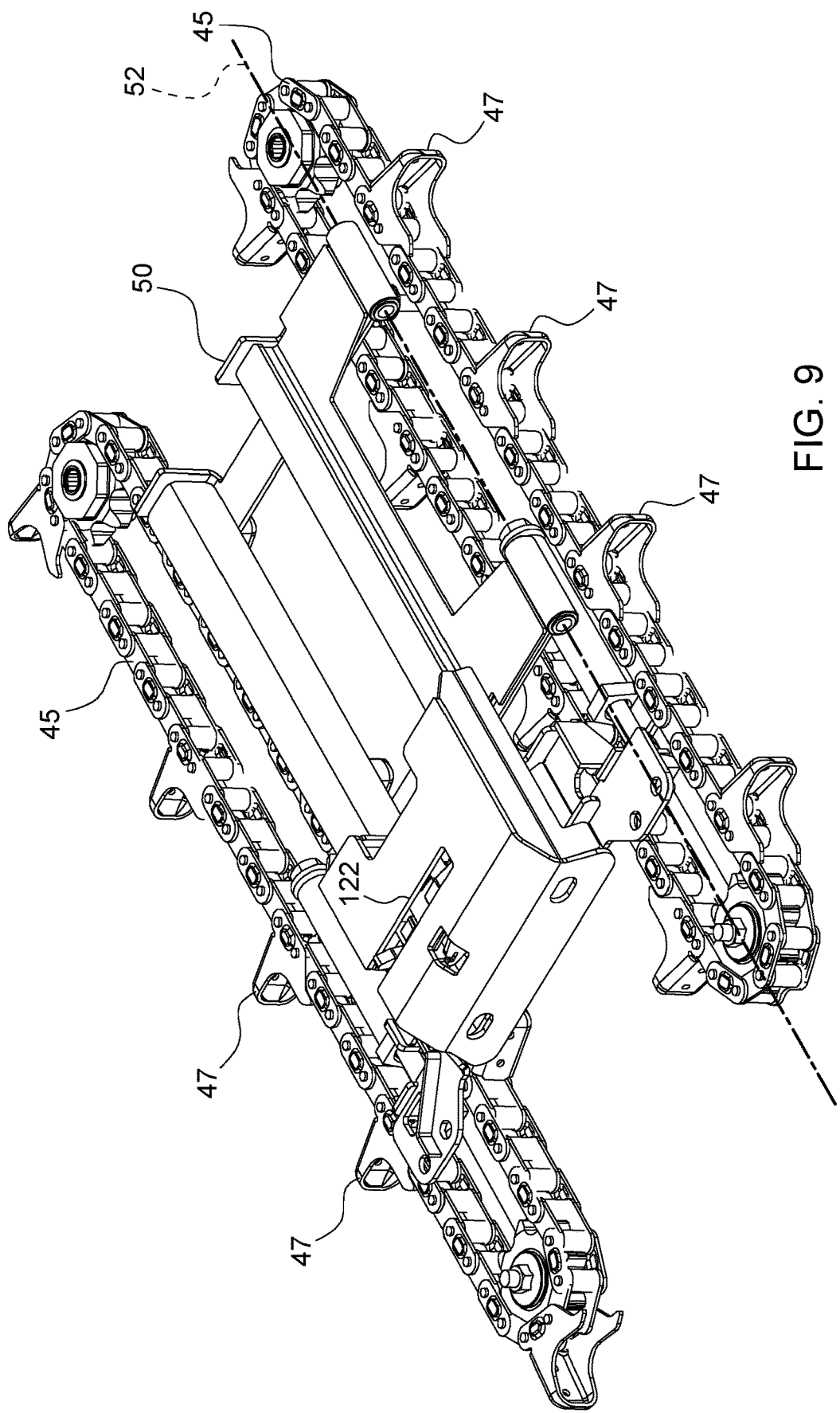
FIGS. 9 and 10 are perspective views of a portion of a row crop head at an interface between a wing frame and a center frame, according to some implementations of the present disclosure.
Figure 10:
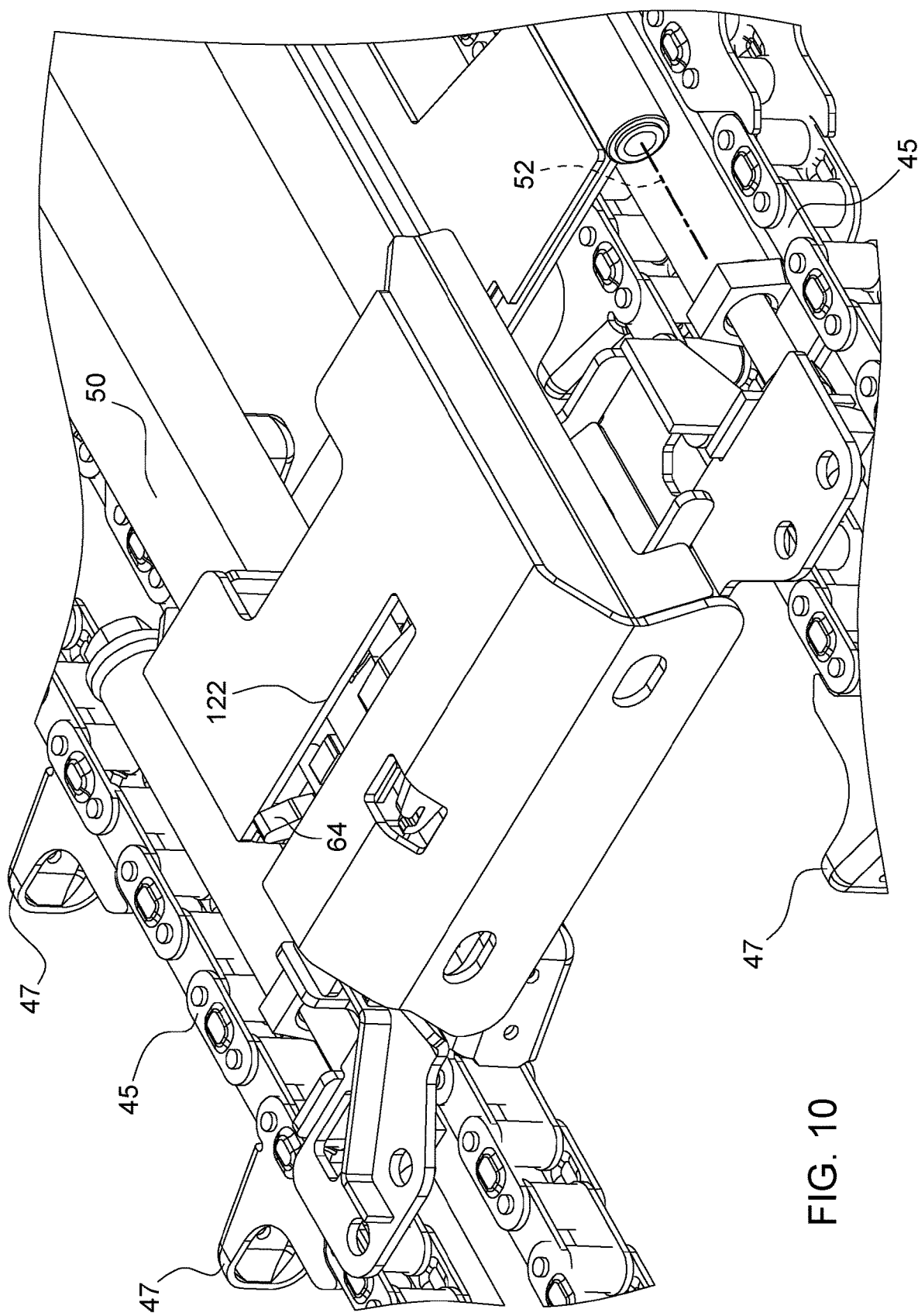

FIGS. 9 and 10 are perspective views of a portion of the row crop head 14 at the interface 46, particularly showing the fold frame 50. FIGS. 9 and 10 show the fold frame 50 in the lowered or unfolded position and the pivoting assembly 48 in the unfolded configuration, which correspond to the wing frame 44 being in the unfolded position. As explained above, the fold frame 50 is pivotable about axis 52, such as when the wing frame is moved between the folded and unfolded positions. Referring to FIG. 10, the fold frame 50 includes a slot 122. The rotatable locking component 64 extends through and is moveable in the slot 122 as rotatable locking component 64 is rotated during folding of the wing frame 44. As the wing frame 44 is moved into the folded position, the rotatable locking component 64 is rotated about the shaft 86, shown in FIG. 5. As the rotatable locking component 64 rotates, the locking portion 108 extends into and moves along the slot 122 until a third surface 124 of the rotatable locking component 64 formed on the L-shaped locking portion 108 abuts an exterior surface 126 of the fold frame 50, thereby locking the fold frame 50 into an open position.

Figure 12:
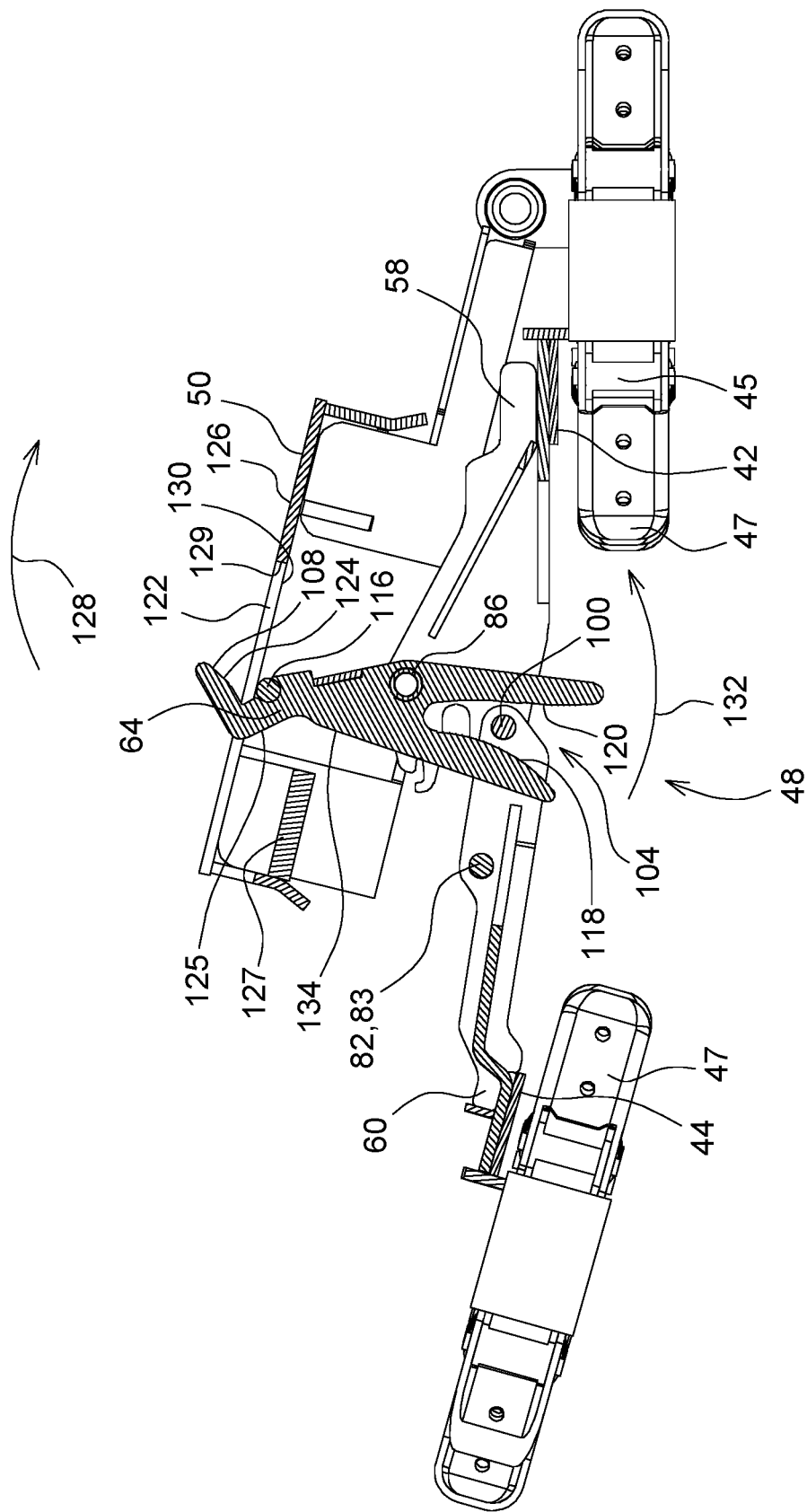
FIG. 12 is a cross-sectional view of the example pivoting assembly of FIG. 11 in which the pivoting assembly is in a partially folded configuration, according to some implementations of the present disclosure.
Figure 13:
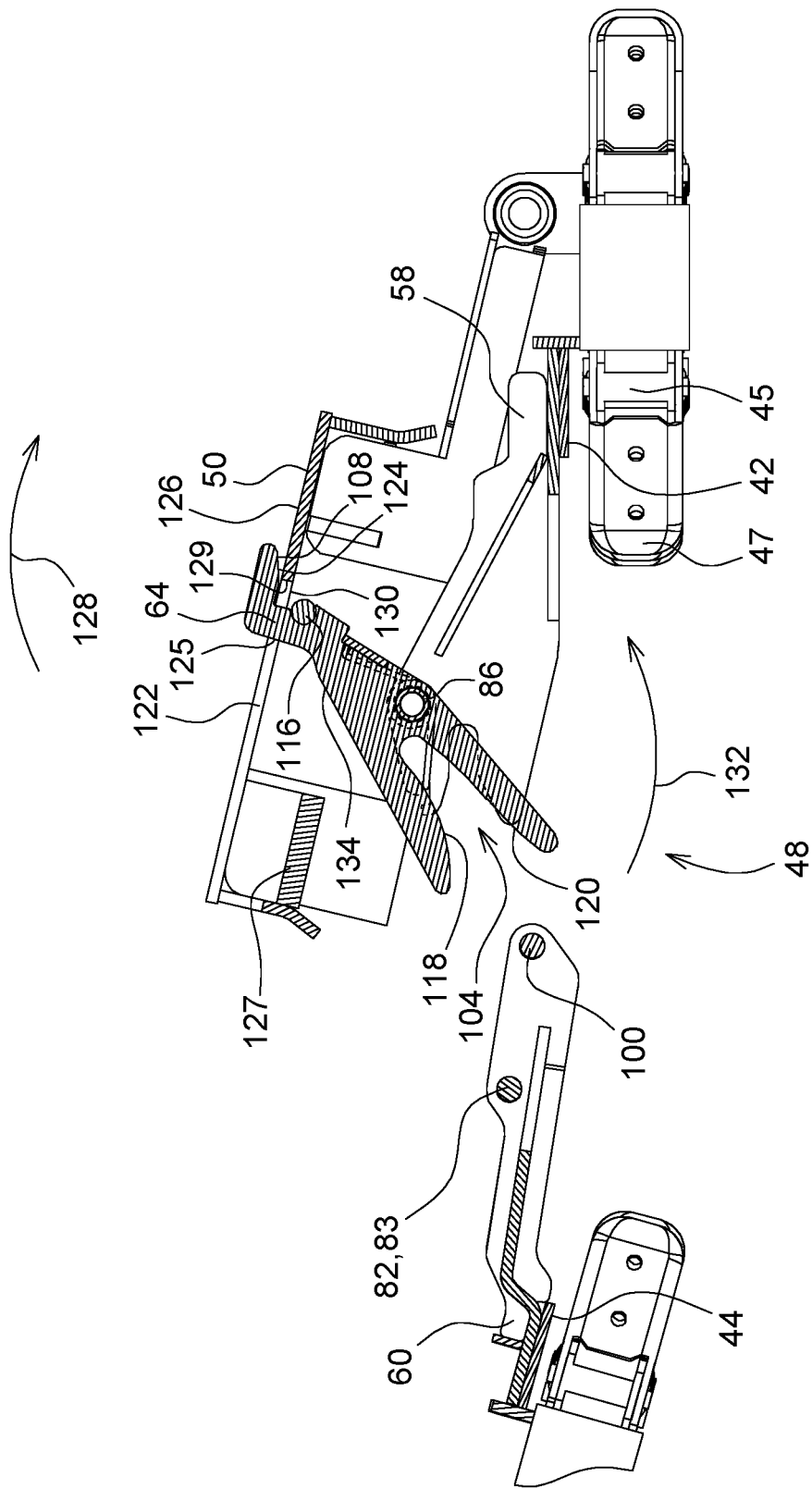
FIG. 13 is a cross-sectional view of the example pivoting assembly of FIG. 11 in which the pivoting assembly is a folded configuration, according to some implementations of the present disclosure.

Operation of the pivoting assembly 48 is now described with respect to FIGS. 11-13. FIG. 11 shows a partial cross-sectional view of the pivoting assembly 48 at an interface 46 between the center frame 42 and the wing frame 44. In FIG. 11, the wing frame 44 and the fold frame are shown in the unfolded position. Similarly, FIG. 11 shows the pivoting assembly 48 in an unfolded configuration. As shown, the first bracket 58 is mounted to the center frame 42, and the second bracket 60 is mounted to the wing frame 44. The rotatable locking component 64 is pivotably mounted to the first bracket 58 on the shaft 86, as described above. The fold frame 50 and the slot 122 formed in the fold frame 50 are also shown.

In the unfolded configuration of the pivoting assembly 48, a fourth surface 125 of the rotatable locking component 64 formed on an exterior of the L-shaped portion 108 abuts a shelf 127 formed on the fold frame 50, and the pin 116 of the rotatable locking component 64 abuts an interior surface 130 of the fold frame 50. In some implementations, an elastomeric material or other compressible material may be assembled to, applied to, or otherwise included on a surface of the shelf 127 that abuts the fourth surface 125. In other instances, the compressible material may be applied to the fourth surface 125. The compressible material may be included to reduce impact loading between the shelf 127 and the rotatable locking component 64 during operation of the pivoting assembly 48. The compressible material may also ensure indirect contact between the shelf 127 and the rotatable locking component 64, which may otherwise be prevented due to variations in part tolerances, when the pivoting assembly 48 is in the unfolded configuration. Additionally, with the pivoting assembly 48 in the unfolded configuration, the second pin 100 of the second bracket 60 contacts the second surface 120 of the rotatable locking component 64, and the first pin 83 of the second bracket 60 contacts a sixth surface 134 of the rotatable locking component 64. As explained earlier, in some implementations, the portion of the first pin 83 extending between the opposing sides 84 may be omitted. The sixth surface 134 extends along an exterior side of the first end portion 98, opposite the first side 118. Further, the end portions 82 of the first pin 83 are received into the aligned slots 76 of the first bracket 58. This inter-engagement between the components of the pivoting assembly 48 and the fold frame 50 operate to lock the pivoting assembly 48 and the fold frame 50 into the unfolded configuration and unfolded position, respectively.

Referring to FIG. 12, as the wing frame 44 is moved into the folded position, the wing frame 44 is pivoted resulting in displacement both outwardly and above the center frame 42 when the row crop head 14 is viewed on level ground. The second bracket 60 moves with the wing frame 44, and, consequently, the end portions 82 of the first pin 83 of the second bracket 60 are withdrawn from the aligned slots 76 formed in the first bracket 58. Also, the second pin 100 is displaced from contact with the second surface 120 of the rotatable locking component 64 and into contact with the first surface 118 of the rotatable locking component 64, causing the rotatable locking component 64 to pivot about shaft 86 in the direction of arrow 128. As the wing frame 44 continues to pivot, the second pin 100 of the second component 60 slides along the first surface 118, causing the rotatable locking component 64 to rotate through the slot 122 of the fold frame 50, as shown in FIG. 12. Additionally, as the rotatable locking component 64 rotates, the pin 116 slides along an interior surface 130 of the fold frame 50 located at an end 129 of the slot 122, causing the fold frame 50 to pivot about the axis 52 (as shown in FIGS. 4 and 9). Because the crop divider 34 is coupled to the fold frame 50, the crop divider 34 is also displaced and pivoted about axis 52. The rotatable locking component 64 continues to rotate in the direction of arrow 128 until the third surface 124 of the L-shaped locking portion 108 abuts the exterior surface 126 of the fold frame 50, resulting in the pivoting assembly 48 being a folded configuration and securing the fold frame 50 into the folded or raised position. Therefore, the pivoting assembly 48 is operable to both lock the fold frame 50 and, in some implementations, the crop divider 34 in the folded and unfolded configurations as well as to move the fold frame 50 and crop divider 34 during folding and unfolding of the wing frames 44 in order to avoid interference between the fold frame 50 and crop divider 34 with other parts of the crop row head 14, thereby avoiding damage to the row crop head 14.

Continued rotation of the wing frame 44 causes the second pin 100 to be withdrawn from the recess 104 of the rotatable locking component 64. As shown in FIG. 13, the second bracket 60 is fully removed from first bracket 58 and the rotatable locking component 64 as a result of rotation of the wing frame 44 relative to the center frame 42. In some implementations, the wing frame 44 rotates approximately 180° relative to the center frame 42 such that the wing frame 44 is located adjacent to and above with the center frame 42, as the row crop head 14 is viewed on level ground. In other implementations, the wing frame 44 may rotate less than 180°.

Curvature of the first surface 118 may be selected to alter a rate at which the rotatable locking component 64 and, hence, the fold frame 50 are rotated into a folded position in response to movement of the second bracket 60. For example, a shape of the first surface 118 may be selected to cause the rate of rotation of the fold frame to accelerate or decelerate or both as second pin 100 moves along the first surface 118. Controlling a rate at which the fold frame 50 is pivoted during folding of the wing frame 44 may avoid interference between different parts of the row crop head 14, thereby avoiding damage to the row crop head 14.

During unfolding of the wing frame 44, the second pin 100 contacts and slides along the second surface 120 of the rotatable locking component 64, causing the rotatable locking component 64 to rotate in the direction of arrow 132, opposite arrow 128. As a result, the surface 124 of the L-shaped locking portion 108 is removed from the exterior surface 126, and the fold frame 50 is pivoted in the direction of arrow 132 as the pin 116 slides along the interior surface 130 of the fold frame 50. A rate at which the fold frame 50 is returned to the unfolded position may be controlled based on a curvature applied to the second surface 120. For example, similar to the first surface 118, a curvature may be applied to the second surface 120 to alter a rate of rotation (e.g., accelerate, decelerate, or both) of the fold frame 50 and crop divider 34. In the illustrated example, with the wing frame 44 returned to the unfolded position (shown in FIG. 11), the pivoting assembly 48 is returned to the unfolded configuration. With the pivoting assembly 48 in the unfolded configuration, the second pin 100 rests against the second surface 120; the first pin 83 contacts a sixth surface 134 of the rotatable locking component 64; the end portions 82 of the first pin 83 are received into the aligned slots 76 of the first component 58; and the fourth surface 125 rests against the shelf 127. In other implementations, the portion of the first pin 83 extending between the opposing sides 84 may be removed. As a result, the fourth surface 125 rests against the shelf 127 without a portion of the first pin 83 contacting the sixth surface 134 of the rotatable locking component 64.

FIGS. 11-13 illustrate operation of the pivoting assembly 48 associated with a wing frame 44 at a first end 136 of the center frame 42 of the row crop head 14 shown in FIG. 3. For a row crop head 14 that includes a second wing frame 44, such as the row crop head 14 shown in FIG. 3, another pivoting assembly 48 may be arranged at the interface 46 at a second end 138 of the center frame 42 but having a mirrored arrangement to that associated with the first end 136.

Figure 14:
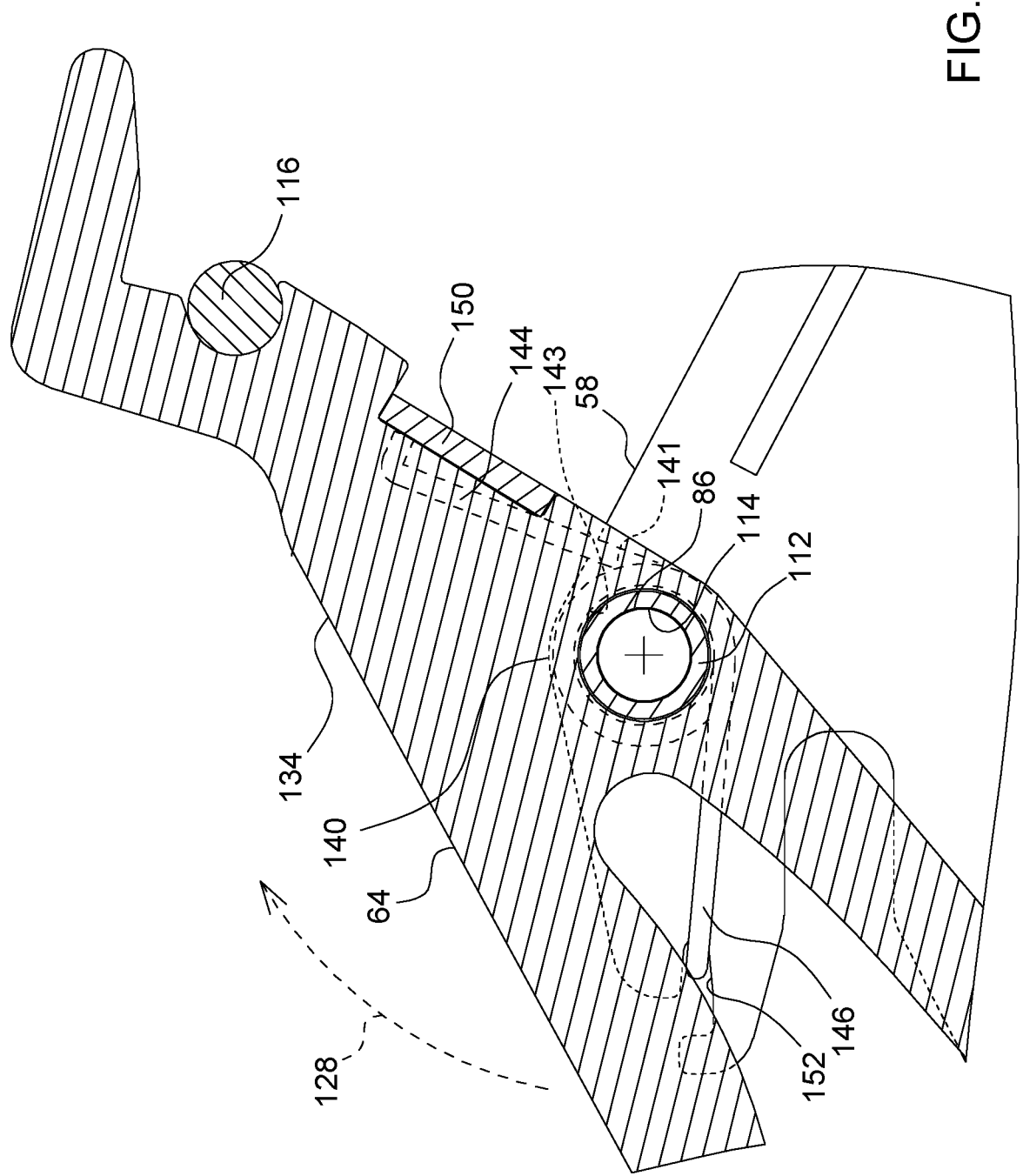
FIG. 14 is a detail view of an example pivoting assembly showing a spring incorporated in the pivoting assembly, according to some implementations of the present disclosure.

Referring to FIGS. 5 and 14, the pivoting assembly 48 also includes torsion springs 140. The torsion springs 140 are received onto an outer surface 142 of the cylindrical sleeve 112. In the illustrated example, the torsion springs 140 include a plurality of coils 141 defining a passage 143. The cylindrical sleeve 112 extends through the passage 143 when the torsion springs are received onto the outer surface 142. Each of the torsion springs 140 include a first freely-extending end 144 and a second freely-extending end 146. The ends 144 and 146 include hook portions 147. The hook portions 147 of the first ends 144 of the torsion springs 140 are received into notches 148 formed in tabs 150 of the rotatable locking component 64. The hook portions 147 of the second ends 146 are received into notches 152 formed in in the first bracket 58. Although the illustrated example includes two torsion springs 140, other implementations may include fewer, e.g., a single torsion spring 140, or additional torsion springs 140.

As shown in FIG. 14, the springs 140 are loaded so as to apply a biasing force that urges the rotatable locking component 64 into the folded configuration. Thus, for the wing frame 44 located at the first end 136 of the center frame 42, as shown in FIG. 2, the torsion springs 140 are configured to apply a biasing force that urges the rotatable locking component 64 to rotate in the direction of arrow 128 relative to the first bracket 58 and into a position corresponding to the folded configuration of the pivoting assembly 48. In the unfolded configuration, the ends 144 and 146 may be laterally aligned or a few degrees offset from lateral alignment, placing the springs 140 in a greatest amount of deformation and, hence, causing the springs 140 to apply the greatest biasing force to the rotatable locking component 64. In some implementations, similar torsion springs may be applied to a pivoting assembly 48 provided at the interface 46 between the center frame 42 and the wing frame 44 at the second side 138 of the center frame 42. Although torsion springs are described, other types of springs or biasing components may be used to apply a biasing force to the rotatable locking component 64 as described above.

Figure 15:
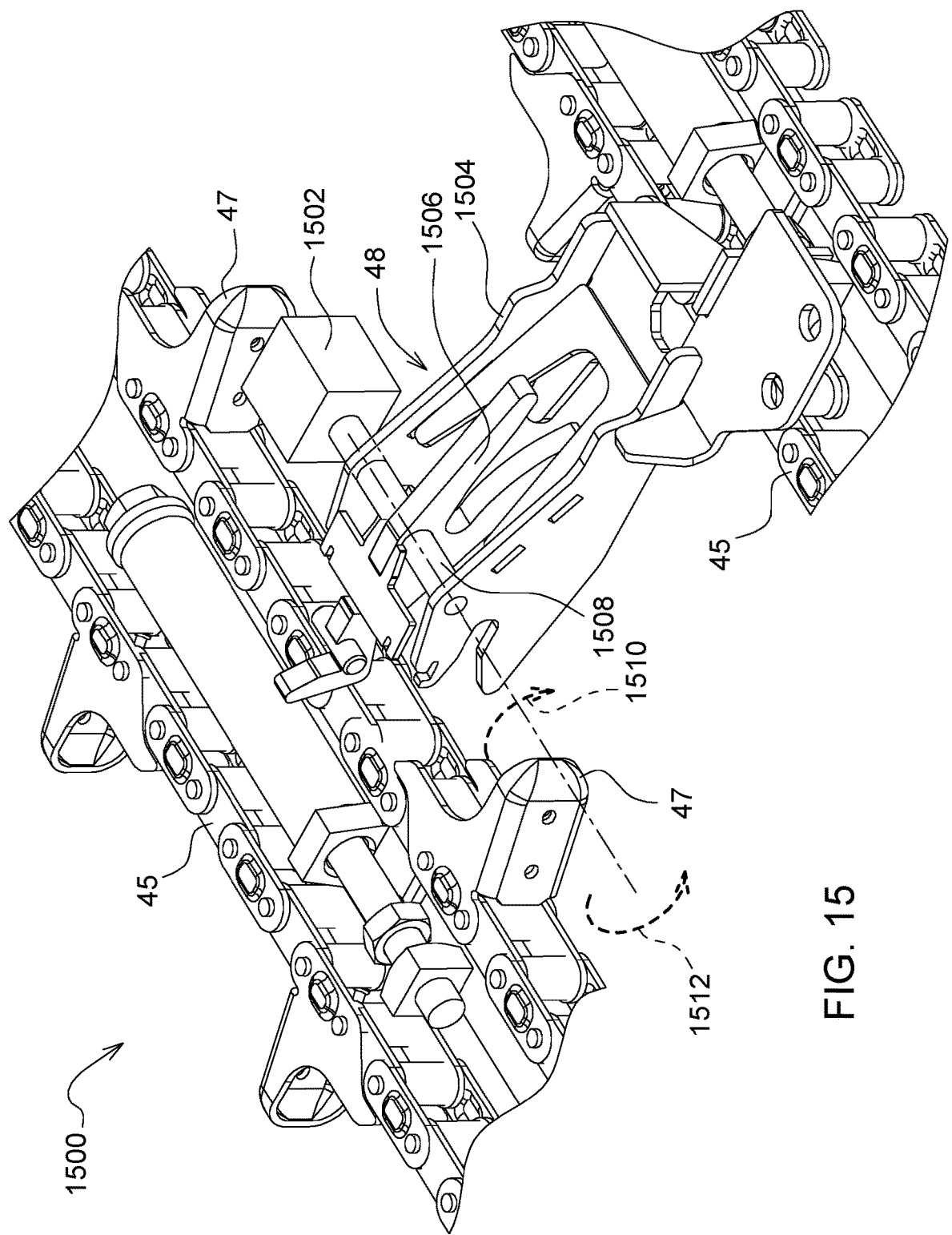
FIG. 15 is a perspective view of another example pivoting assembly, according to some implementations of the present disclosure.

FIG. 15 is a perspective view of another example pivoting assembly 1500. As shown in FIG. 15, the pivoting assembly 1500 is in the unfolded configuration. The pivoting assembly 1500 is similar to the pivoting assembly 48 described earlier. However, the pivoting assembly 1500 is operated by an actuator 1502, such as a rotary actuator. In some implementations, the actuator 1502 may be hydraulic, electric, or pneumatic. Although a rotary actuator 1502 is described in the context of the pivoting assembly 1500, other types of actuators may be used. For example, a linear actuator, either alone or in combination with a linkage, may be used to actuate the pivoting assembly 1500. In still other implementations, other types of actuators or mechanisms to cause the pivoting assembly 1500 to move between a folded configuration and an unfolded configuration may be used.

The pivoting assembly 1500 also includes a bracket 1504 and a rotatable locking component 1506. The bracket 1504 and the rotatable locking component 1506 may be similar to the second bracket 60 and the rotatable locking component 64, respectively, described earlier. A second bracket, similar to the first bracket 504 of the pivoting assembly 48, may be omitted from the pivoting assembly 1500 as a result of the the actuator 1502. Because the actuator 1502 operates to actuate the pivoting assembly 1500, a second bracket to perform actuation of the rotatable locking component 1506 is superfluous and, therefore, omitted. Similar to the pivoting assembly 48, the rotatable locking component 1506 is rotatably coupled to the bracket 1504. Further, in the illustrated example, the actuator 1502 is coupled to the rotatable locking component 1506 at a cylindrical sleeve 1508. The cylindrical sleeve 1508 is similar to the cylindrical sleeve 112 of the rotatable locking component 64.

In operation, the actuator 1502 rotates the rotatable locking component 1506 in about a shaft, similar to shaft 86, received into the cylindrical sleeve 1508. With the pivoting assembly 1500 in the unfolded configuration as shown in FIG. 15, the actuator 1502 rotates the rotatable locking component 1506 in the direction of arrow 1510. As the rotatable locking component 1506 rotates in the direction of arrow 1510, the rotatable locking component 1506 operates to pivot or otherwise displace a fold frame and associated crop divider, as described earlier. When fully rotated by the actuator 1502, the rotatable locking component 1506 is in the folded configuration and secures the fold frame in position as similarly shown in FIG. 13. From the folded configuration, rotation of the rotatable locking component 1506 by the actuator 1502 in the direction of arrow 1512 operates to move the fold frame and associated crop divider into the unfolded configuration, as shown similarly in FIG. 11. As a result, the pivoting assembly 1500 is operable to position the fold frame and associated crop divider into the folded configuration and unfolded configuration independent of movement of the wing frames of a row crop head.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A pivoting assembly, the pivoting assembly comprising:
   a first bracket configured to be mounted to a first portion of a row crop head;
   a second bracket configured to be mounted to a second portion of a row crop head movable relative to the first portion; and
   a rotatable locking component pivotably coupled to the first bracket, the rotatable locking component rotatable between an unlocked configuration and a locked configuration in response to movement of the second bracket relative to the first bracket.

2. The pivoting assembly of claim 1, wherein the second bracket comprises a first pin, wherein the rotatable locking component comprises a recess, and wherein the first pin is removably receivable into a recess of the rotatable locking component to cause rotation of rotatable locking component.

3. The pivoting assembly of claim 2, wherein the recess of the rotatable locking component defines a first surface and a second surface, wherein movement of the second bracket away from the first bracket causes the first pin to engage the first surface to rotate the rotatable locking component into the locked configuration, and wherein movement of the second bracket towards the first bracket causes the first pin to engage the second surface to rotate the rotatable locking component into the unlocked configuration.

4. The pivoting assembly of claim 1, wherein the first bracket further comprises:
   opposing sides defining a central recess; and
   slots formed into the opposing sides,
   wherein the second bracket further comprises a second pin, and
   wherein end portions of the second pin are received into the slots and the second bracket is received into the central recess when the rotatable locking component is in the unlocked configuration.

5. The pivoting assembly of claim 4, wherein the rotatable locking component abuts the second pin of the second bracket when the rotatable locking component is in the unlocked configuration.

6. The pivoting assembly of claim 1, wherein the rotatable locking component further comprises a hollow sleeve defining a bore, wherein the first bracket further comprises apertures formed in opposing sides of the first bracket, and further comprising a shaft received into the bore and the apertures, the rotatable locking component rotatable on the shaft.

7. The pivoting assembly of claim 1, wherein the rotatable locking component further comprises a locking portion configured to lock a crop divider of the row crop head into a folded position.

8. The pivoting assembly of claim 1, further comprising a biasing component coupled to the first bracket and the rotatable locking component, wherein the biasing component is operable to apply a biasing force that urges the rotatable locking component into the locked configuration.

9. A row crop head for harvesting crops, the row crop head comprising:
   a center frame;
   a wing frame pivotably coupled to the center frame and movable between a folded position in which the wing frame is misaligned with the center frame and an unfolded position in which the wing frame is aligned with the center frame, the center frame and the wing frame forming an interface therebetween;
   a crop divider covering at least part of the interface; and
   a pivoting assembly disposed at the interface, the pivoting assembly comprising:
      a first bracket coupled to the center frame;
      a second bracket coupled to the wing frame; and
      a rotatable locking component pivotably coupled to the first bracket and, in response to movement of the second bracket relative to the first bracket, movable between a locked configuration in which the rotatable locking component secures the crop divider into a folded position when the wing frame is in a folded position and an unlocked position when the wing frame is in an unfolded position.

10. The row crop head of claim 9, wherein the second bracket comprises a first pin, wherein the rotatable locking component comprises a recess, and wherein the first pin is removably receivable into a recess of the rotatable locking component to cause rotation of rotatable locking component.

11. The row crop head of claim 10, wherein the recess of the rotatable locking component defines a first surface and a second surface, wherein movement of the wing frame into the folded position causes the first pin of the second bracket to engage the first surface to rotate the rotatable locking component into the locked configuration, and wherein movement of the wing frame into the unfolded position causes the first pin of the second bracket to engage the second surface to rotate the rotatable locking component into the unlocked configuration.

12. The row crop head of claim 9, wherein the first bracket further comprises:
opposing sides defining a central recess; and
slots formed into the opposing sides,
wherein the second bracket further comprises a second pin, and wherein end portions of the second pin are received into the slots and the second bracket is received into the central recess when the rotatable locking component is in the unlocked configuration.

13. The row crop head of claim 12, wherein the rotatable locking component abuts the second pin of the second bracket when the rotatable locking component is in the unlocked configuration.

14. The row crop head of claim 9, wherein the rotatable locking component further comprises a hollow sleeve defining a bore, wherein the first bracket further comprises apertures formed in opposing sides of the first bracket, and further comprising a shaft received into the bore and the apertures, the rotatable locking component rotatable on the shaft.

15. The row crop head of claim 9, wherein the crop divider comprises a fold frame, wherein the rotatable locking component further comprises:
a locking portion; and
a first surface formed on the locking portion, wherein the locking portion is receivable into a slot formed in the fold frame, and wherein the first surface abuts an exterior surface of the fold frame when the wing frame is in the folded position.

16. The row crop head of claim 15, further comprising a biasing component coupled to the first bracket and the rotatable locking component, wherein the biasing component is operable to apply a biasing force that urges the rotatable locking component in a direction to cause the first surface of the rotatable locking component to contact the exterior surface of the fold frame.

17. A pivoting assembly of a row crop head including a center frame and a wing frame pivotably coupled to the center frame between a folded position and an unfolded position, the center frame and the wing frame defining an interface therebetween and a crop divider covering at least a portion of the interface, the pivoting assembly comprising:
a first bracket configured to be mounted to the center frame of the row crop head, the first bracket comprising opposing sides defining a central recess; and
a second bracket configured to be mounted to the wing frame of the row crop head, the second bracket comprising a first pin;
a rotatable locking component rotatably coupled to the first bracket and receivable into the central recess of the first bracket, the rotatable locking component comprising:
a recess formed at a first end, the recess defining a first surface and a second surface and the first pin of the second bracket receivable into the recess; and
a locking portion formed at a second end, opposite the first end, the locking portion configured to lock the crop divider into a folded position when the wing frame is in the folded position, the rotatable locking component rotatable in response to pivoting movement of the second bracket relative to the first bracket.

18. The pivoting assembly of claim 17, wherein the first pin of the second bracket is configured to contact the first surface of the rotatable locking component to rotate the rotatable locking component in a first direction towards a locked configuration and wherein the first pin of the second bracket is configured to contact the second surface of the rotatable locking component to rotate the rotatable locking component in a second direction, opposite the first direction, towards an unlocked configuration.

19. The pivoting assembly of claim 17, wherein the first bracket further comprises aligned slots formed in the opposing sides, wherein the second bracket further comprises a second pin, and wherein end portions of the second pin are receivable into the aligned slots when the second bracket is at a first position corresponding to the unfolded position.

20. The pivoting assembly of claim 19, wherein the second bracket further comprises:
a first side;
a second side laterally offset from the first side; and
a recess formed between the first side and the second side,
wherein the rotatable locking component comprise a first end portion and a second end portion, the recess of the rotatable locking component formed between the first end portion and the second end portion,
wherein the first pin and the second pin extend between the first side and the second side across the recess, and
wherein the first end portion of the rotatable locking component is positioned within the recess of the second bracket between the first pin and the second pin when the second bracket is at the first position.

* * * * *